United States Patent [19]

Crates et al.

[11] Patent Number: 5,340,084

[45] Date of Patent: Aug. 23, 1994

[54] FISH TAPE REEL AND REEL ASSEMBLY WITH DETACHABLE ACCESSORY STORAGE COMPARTMENT

[75] Inventors: Thomas B. Crates, Clover, S.C.; Donald N. Hesprich, Gastonia, N.C.

[73] Assignee: Jameson Corporation, Charlotte, N.C.

[21] Appl. No.: 5,480

[22] Filed: Jan. 15, 1993

Related U.S. Application Data

[63] Continuation-in-part of Ser. No. 870,409, Apr. 17, 1992, Pat. No. 5,201,495, which is a continuation of Ser. No. 703,798, May 21, 1991, Pat. No. 5,106,056.

[51] Int. Cl.$^5$ .............................................. H02G 1/08
[52] U.S. Cl. ......................... 254/134.3 FT; 242/405; 220/553
[58] Field of Search ............... 254/134.3 R, 134.3 FT, 254/134.4; 242/96; 220/553, 557, 500

[56] References Cited

U.S. PATENT DOCUMENTS 2,689,709  9/1954  Waldschmidt ............ 254/134.3 FT
4,913,369  4/1990  Lia et al. ....................... 242/96

OTHER PUBLICATIONS

1992 Ideal Industries, Inc., Center-Pak Inside Feed Fish Tape, Form No. L-54.

Primary Examiner—Bruce M. Kisliuk
Assistant Examiner—Eileen Morgan
Attorney, Agent, or Firm—W. Thad Adams, III

[57] ABSTRACT

A fish tape reel is formed by mating first and second hollow reel segments together, thus defining a fish tape enclosure for receiving a length of fish tape with a fitting on one end thereof. A fish tape access port is formed in at least one of the reel segments for permitting extension and retraction therethrough of a length of fish tape contained in the fish tape enclosure. A detachable storage compartment for containing tools, accessories, and fittings is releasably attached the fish tape reel.

13 Claims, 4 Drawing Sheets

FISH TAPE REEL AND REEL ASSEMBLY WITH DETACHABLE ACCESSORY STORAGE COMPARTMENT

This application is a continuation-in-part application of U.S. Ser. No. 870,409 filed Apr. 17, 1992 now U.S. Pat 5,201,495. The Apr. 17, 1992 application is a continuation application of U.S. Ser. No. 703,798 filed May 21, 1991, now U.S. Pat. No. 5,106,056.

TECHNICAL FIELD AND BACKGROUND OF THE INVENTION

This invention relates to a combination fish tape reel and storage compartment. The storage compartment is normally positioned on and attached to the fish tape reel for storing tools, fittings, and other such accessories. However, the storage compartment is detachable for use separately, or for allowing separate use of the fish tape reel.

Several types of fish tape reels are known. One type, exemplified by U.S. Pat. No. 4,092,780, discloses an electrical fish tape reel assembly which includes a generally annular tape-receiving chamber peripherally bounded by a pair of axially opposed lips adapted to separate to permit winding and unwinding of a fish tape in the chamber. A tape winder is mounted between the lips so as to project outside of the reel on its outer wall and constructed to be moved peripherally around the reel between the lips. A tape passage through the tape winder permits passage of the tape. A handle is provided for holding the reel. The tape passage directed outwardly through the winder at an oblique angle to the radius of the reel and extends through the counter chamber for passage of the tape the tape passage including an inlet passage on the inside of the winder and an outlet passage on the outside thereof spaced from each other to provide an aligned rectilinear path for a free span of tape in the counter chamber. As the handle is moved around the periphery of the reel, the lips spread to permit passage of the tape. Such a product is made by Ideal Industries.

Another reel uses two solid pie pan-shaped shells attached together to form an inner compartment within which the fish tape is contained. A hole in one of the shells permits the fish tape to be pulled from and into the compartment. The hole is positioned on one of the major sides of the reel. Such a reel is made by Lancier Inc.

The prior art design which permits the lips of the reel to spread to permit the fish tape to exit is relatively complicated, since it also includes a handle with a lock on it which is subject to breakage and wear. The tape is manipulated on the outer peripheral wall of the reel, exposing it to damage such as from dropping or other heavy impact. Since the lips of the reel are always open at some point on the outer peripheral wall of the reel, dirt and other contaminants can easily enter, causing additional wear as well as greater friction making the tape more difficult to extend and retract.

The prior art design which extends the fish tape through the side wall is simpler to operate, but also exposes the tape to damage, since it is exposed on one of the major surfaces of the reel. Another disadvantage of this design is that it is not "ambidextrous." This means simply that tape may not be fed from the reel to either side. Thus, care must be taken to correctly orient the reel side-to-side or top-to-bottom.

Because of safety considerations fiberglass tapes are now commonly used in place of steel because of their non-conductivity of electricity. Fiberglass tapes are more prone to breakage and must be repaired by splicing the tape. No known prior art fish tape reel provides a convenient place for storing small tools, tubes of adhesive and similar accessories typically used to repair in the field broken fiberglass fish tapes.

The design shown described in this application and claimed in the claims provides a means of protecting the fish tape from breakage and damage, and includes a detachable storage compartment for providing a convenient means of storing small tools, fittings, tubes of adhesive and similar accessories typically used to repair in the field broken fiberglass fish tapes.

SUMMARY OF THE INVENTION

Therefore, it is an object of the invention to provide a fish tape reel and detachable storage compartment which includes first and second hollow reel segments mated together to define a fish tape reel having an enclosed fish tape compartment for receiving a length of coiled fish tape. The reel defines first and second spaced-apart and opposing side walls and inner and outer spaced-apart and opposing peripheral walls. The inner peripheral wall defines a through void in the reel for which a detachable storage compartment may be securely attached. Fish tape access means are provided in the inner peripheral wall of the reel for extending and retracting therethrough a length of fish tape contained in the compartment.

It is another object of the invention to provide a fish tape reel which includes a detachable storage compartment for storing tools, accessories, and fittings.

According to one preferred embodiment of the invention, a fish tape reel is formed by mating first and second hollow reel segments together, thus defining a fish tape enclosure for receiving a length of fish tape with a fitting on one end thereof. A fish tape access port is formed in at least one of the reel segments for permitting extension and retraction therethrough of a length of fish tape contained in the fish tape enclosure. A detachable storage compartment for containing tools, accessories, and fittings is releasably attached the fish tape reel.

According to another preferred embodiment of the invention, the fish tape reel defines a void therein having an inner peripheral wall of a predetermined shape for carrying a storage compartment.

According to yet another preferred embodiment of the invention, the inner peripheral wall of the fish tape reel has formed thereon a plurality of complementary lap joint members for securely mating the first and second hollow reel segments to each other.

According to yet another preferred embodiment of the invention, at least some of the complementary lap joint members are relatively flat for allowing the storage compartment to fit substantially adjacent to and with minimal clearance from the inner peripheral wall.

According to yet another preferred embodiment of the invention, the storage compartment includes a curved peripheral wall segment, first and second spaced-apart side peripheral wall segments, and a straight peripheral wall segment. The inner peripheral wall of the fish tape reel includes a curved wall segment and first and second spaced-apart side wall segments. The curved and side peripheral wall segments of the storage compartment substantially correspond to the curved and side wall segments of the inner peripheral wall of the fish tape reel.

According to yet another preferred embodiment of the invention, the storage compartment includes a tongue formed on respective side wall segments for mating connection with corresponding grooves formed in the inner peripheral wall of the fish tape reel for releasably locking the storage compartment onto the inner peripheral wall of the fish tape reel.

According to yet another preferred embodiment of the invention, the storage compartment includes a locking stud formed at the apex of the curved wall segment for insertion into a corresponding hole in the inner peripheral wall of the fish tape reel for releasably locking the storage compartment onto the inner peripheral wall of the fish tape reel.

According to yet another preferred embodiment of the invention, the fish tape reel includes first and second groove inserts for filling the respective grooves when the storage compartment is not being carried by the fish tape reel.

According to yet another preferred embodiment of the invention, the fish tape reel includes a trap for receiving the fitting on the end of the fish tape to prevent extension of the fish tape from the fish tape reel when not in use.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
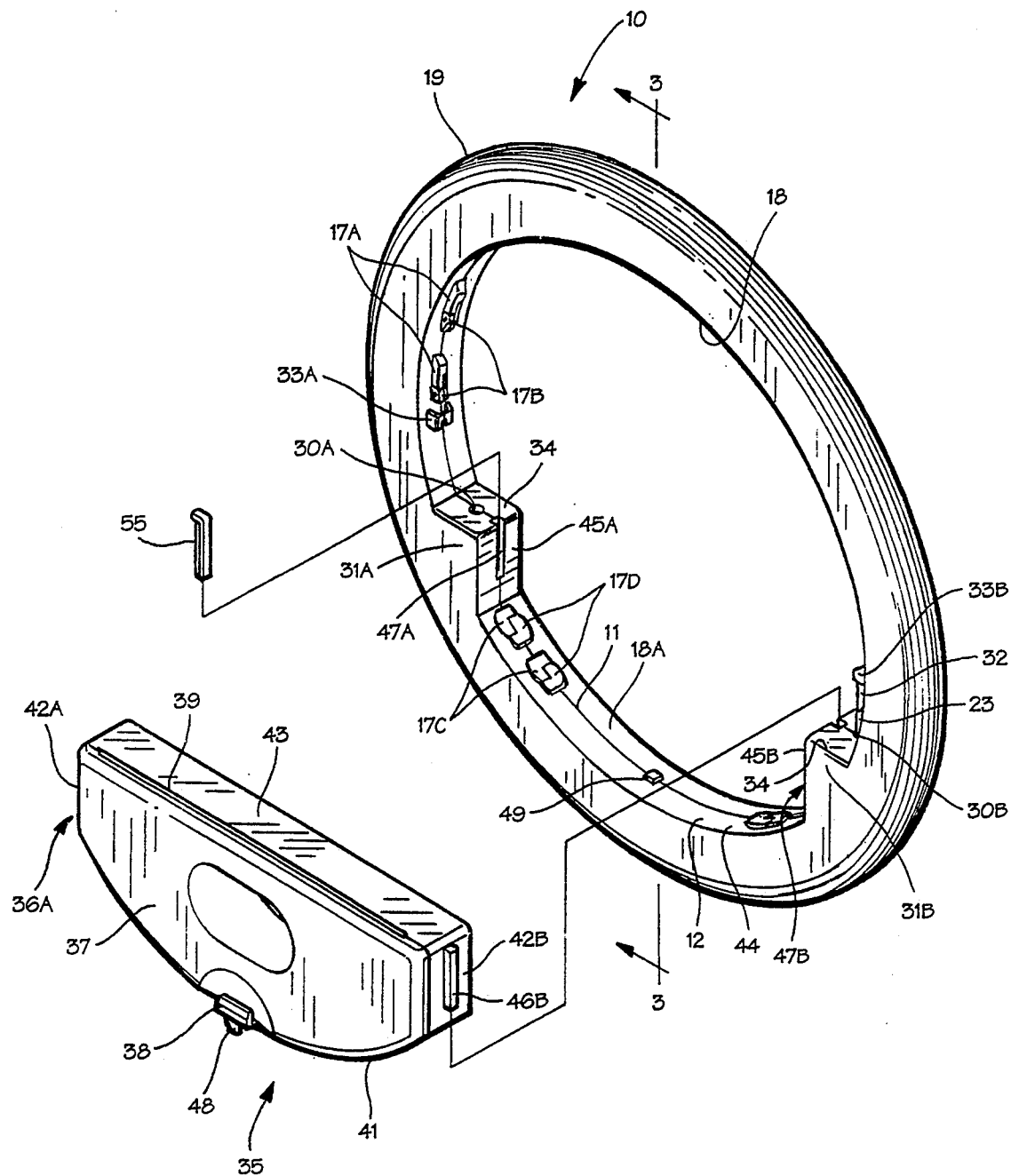
FIG. 1 is a perspective view of a fish tape reel and detachable storage compartment according to a preferred embodiment of the invention.
Figure 2:
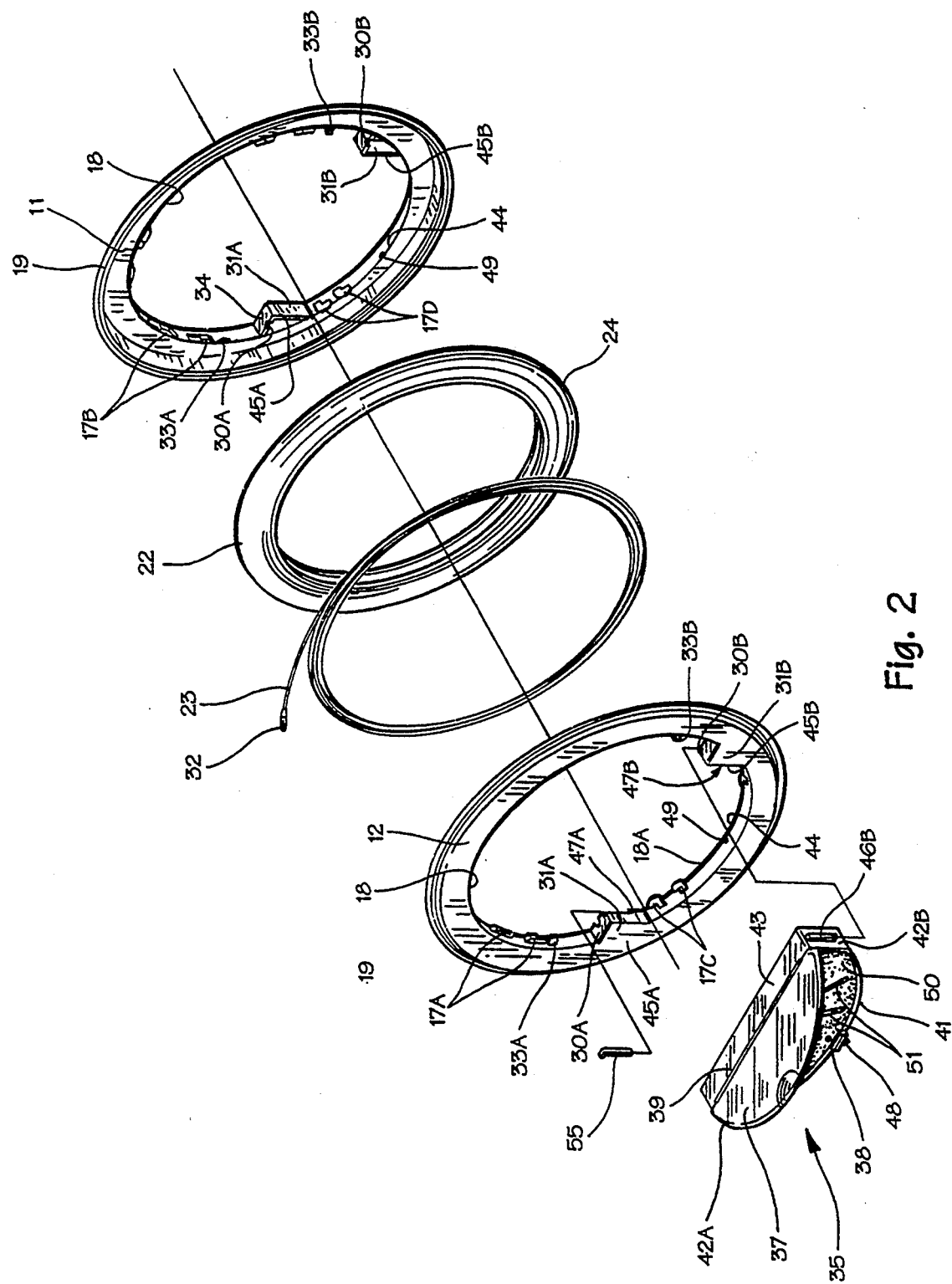
FIG. 2 is an exploded perspective view of the fish tape reel and storage compartment shown in FIG. 1.

Referring now specifically to the drawings, a fish tape reel assembly with detachable storage compartment according to the present invention is illustrated in FIG. 1. As is best shown in FIGS. 1 and 2, a fish tape reel 10 constructed of impact resistant plastic is formed from first and second hollow reel segments 11 and 12. The reel segments 11 and 12 are mated together by pairs of complementary lap joint members 17a and 17b to provide an internal tape enclosure 14 (See FIG. 3). The lap joint members 17a and 17b are formed on the inner periphery of reel segments 11 and 12. To securely mate reel segments 11 and 12, complementary lap joint members 17a and 17b are adjacently aligned such that they overlap when reel segments 11 and 12 are forced together and rotated in opposite directions. The reel segments 11 and 12 are detached and separated by rotating the reel segments in opposite directions to unlock the lap joint members 17a and 17b. Other lap joint members 17c and 17d are relatively flat to permit a detachable storage compartment 35 to fit with minimal clearance directly over the lap joints 17c,d, substantially adjacent the reel 10, as further described below.

Figure 3:
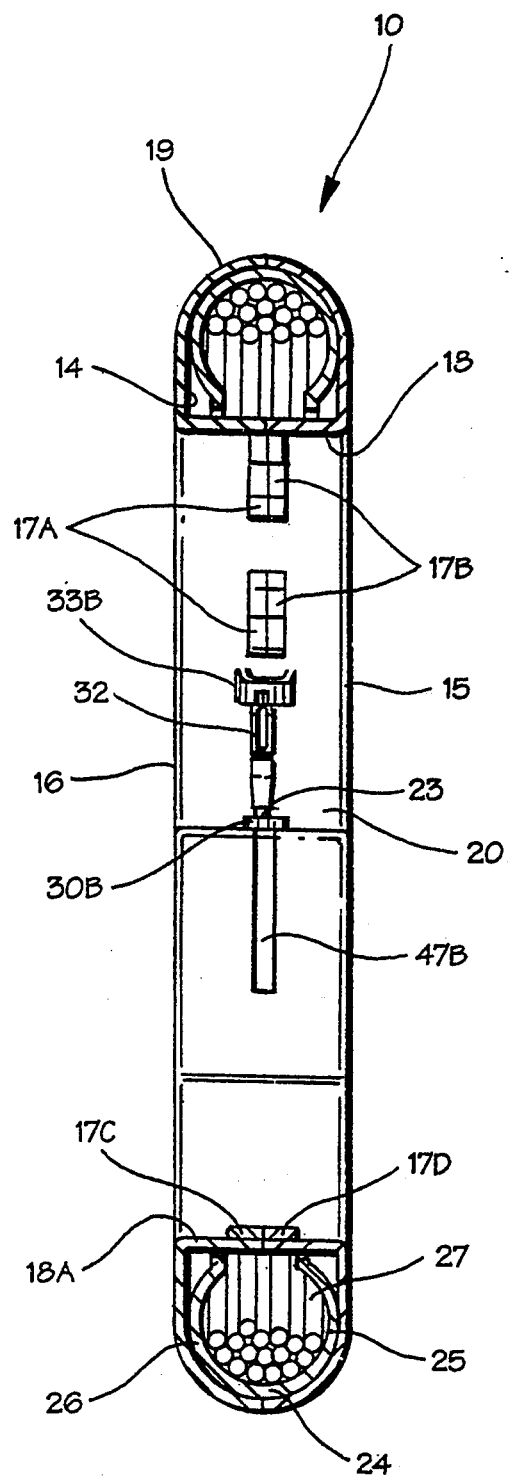
FIG. 3 is a cross-section taken along line 3—3 of FIG. 1.

As is best shown in FIG. 3, reel segments 11 and 12 of reel 10 define first and second spaced-apart and opposing radial side walls 15 and 16. These radial side walls 15, 16 are substantially flat. Reel segments 11 and 12 also define inner and outer spaced-apart and opposing axial peripheral walls 18, 19 which define inner and outer circumferences of the reel 10. The inner peripheral wall 18 defines a through void 20 in reel 10. This void 20 in reel 10 permits the joined reel segments 11 and 12 of reel 10 to be used as a handle by which reel 10 is easily carried.

A section of the inner peripheral wall 18a, which includes the relatively flat lap joint members 17c and 17d, carries the detachable storage compartment 35.

As is shown in FIG. 2, a magazine 22 constructed of a suitable plastic material, for example, polystyrene, holds a coil of fish tape 23. Magazine 22 has an outer wall 24 and integrally-formed opposing side walls 25 and 26 defining a central, inwardly facing channel 27 (See FIG. 3). The plastic material is selected to provide high impact strength and light weight. The magazine 22 is shown in profile in FIG. 3. Magazine 22 is slightly smaller in width that the tape compartment of reel 10 and thus slides easily within the compartment as the tape 23 is extended from and retracted into reel 10.

The fish tape 23 is protected against damage and breakage by placing feeding ports 30a and 30b on the inner peripheral wall 18. As is best shown in FIG. 1, port housings 31a and 31b are integrally formed into the inner peripheral wall 18 of the reel 10. Respective port housings 31a,b have a substantially radially extending wall 34 through which the feeding port 30 extends. The tape 23 is thereby required to bend only slightly as it passes off of the magazine 22 and through feeding port 30 tangent to the inner peripheral wall 18 of the reel.

Since the feeding ports 30a,b reside on the inner peripheral wall 18 and in spaced-apart opposing relation, they are protected from damage while at the same time being ambidextrous, i.e., the fish tape 23 can pass through either feeding port 30a or 30b to either side of the reel 10, as desired, merely by reversing the direction of the magazine 22.

Fitting traps 33a and 33b are integrally molded into the reel 10 directly above respective feeding ports 30a and 30b to receive and retain a fitting 32 attached to one end of the fish tape 23. The trap 33 provides a "garage" for "parking" the fitting 32 when the fish tape 23 is not being used. This prevents the fish tape 23 from uncoiling itself and exiting the fish tape reel 10 under its own tension.

Figure 4:
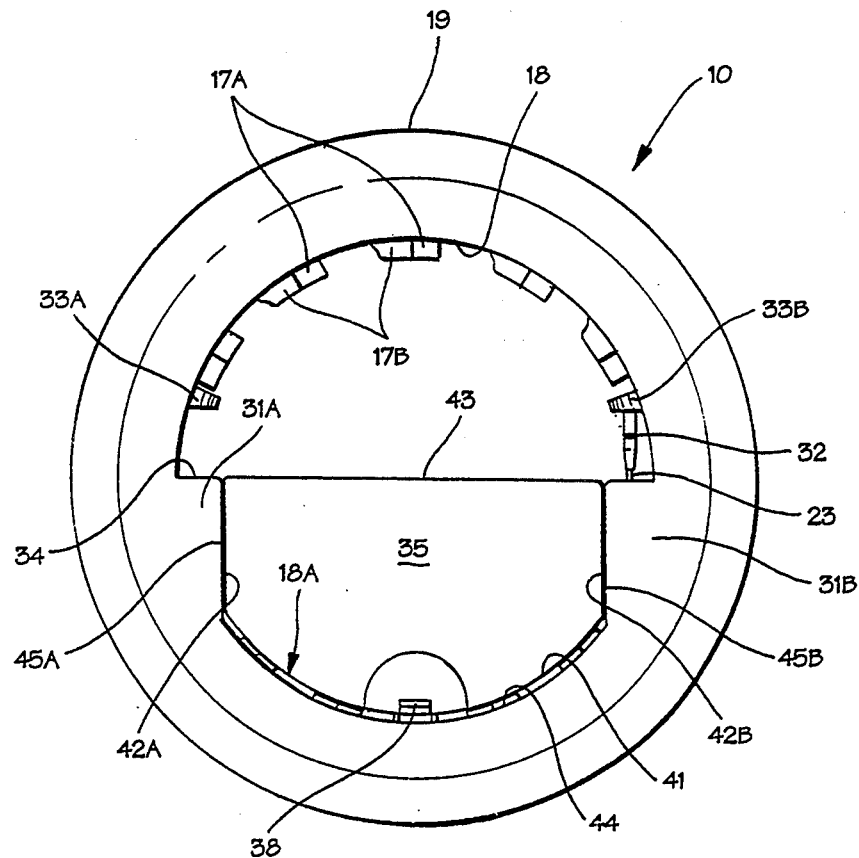
FIGS. 4 and 5 are plan views of both sides of the fish tape reel illustrating how the fish tape may be manipulated from either side.
Figure 5:
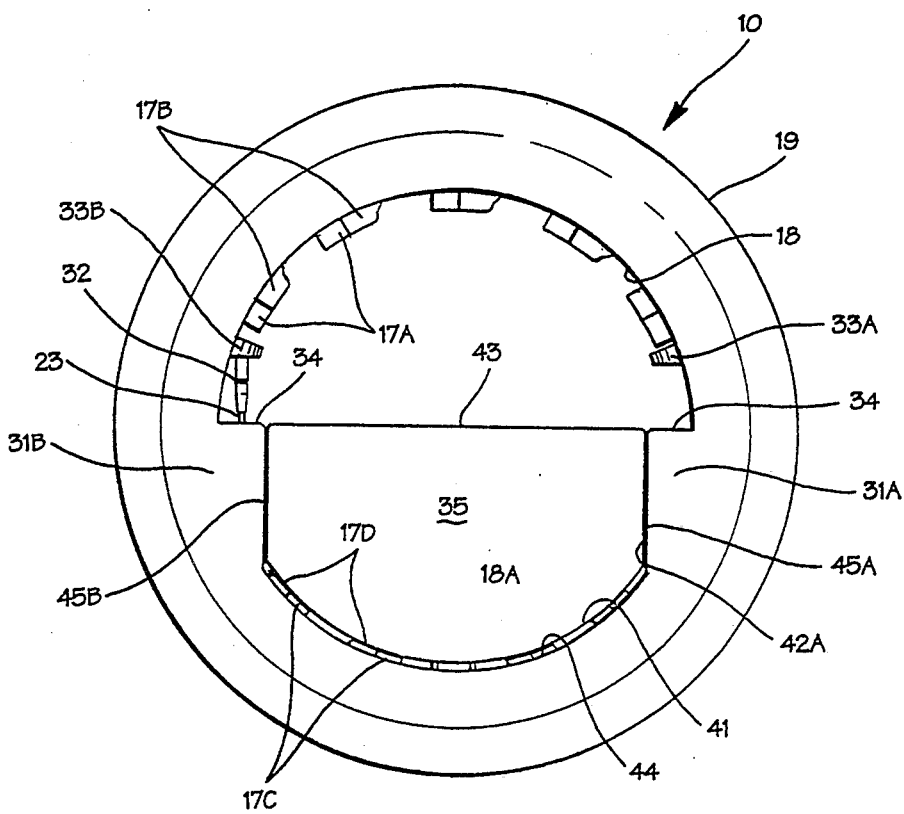

FIGS. 4 and 5 illustrate the reel 10 and detachable storage compartment 35 in combination, respectively showing a front and back view thereof. The storage compartment 35 is constructed of a hard and tough, moisture resistant resin such as polypropylene. As shown, the storage compartment 35 is positioned adjacent the reel 10 and carried by the section 18a of the inner peripheral wall 18. The storage compartment 35 has a curved wall segment 41, respective side wall segments 42a and 42b, and a straight wall segment 43. The section 18a of the inner peripheral wall 18 of the reel 10 includes a curved wall segment 44 and first and second side wall segments 45a and 45b, substantially corresponding to the curved and side wall segments 41 and 42a,b of the storage compartment 35.

A sponge pad 50 (See FIG. 2) is positioned within the storage compartment 35 for holding tools, accessories, or fittings contained in the storage compartment 35 in a secured position against the storage compartment lid 37. Small shaped voids 51 are formed in the pad 50 for receiving similar shaped tools, accessories, or fittings. The lid 37 pivots about an integral hinge 39 between a closed position, as shown in FIGS. 1 and 4, and an open position shown in FIG. 2 which exposes the interior of the compartment 35. The lid is securely closed by a lap fastener 38.

As best shown in FIG. 1, tongues 46a and 46b are formed on respective side walls 42a and 42b of the storage compartment 35 for mating with respective corresponding grooves 47a and 47b formed on the inner peripheral wall 18 of the reel 10. A locking stud 48 is formed at the apex of the curved wall segment 41 of the storage compartment 35 for insertion into a corresponding hole 49 formed in the section 18a of the inner peripheral wall 18. The tongue & groove and stud & hole connections releasably secure the storage compartment 35 to the reel 10. When the storage compartment 35 is detached, or not being carried by the reel 10, groove inserts 55 can be inserted to fill respective vacant grooves 47.

The construction described above provides a reel which is simple to construct and easy to use. It overcomes many of the problems associated with prior art devices.

A fish tape reel is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A fish tape reel, comprising:
   (a) first and second hollow reel segments mated together to define a fish tape enclosure for receiving a length of fish tape with a fitting on one end thereof;
   (b) fish tape access means in at least one of said reel segments for permitting extension and retraction therethrough of a length of fish tape contained in said fish tape enclosure;
   (c) a detachable storage compartment for containing tools, accessories, and fittings, said detachable storage compartment comprising a body and a lid attached to said body and detachable there with from the fish tape reel; and
   (d) attachment means for releasably attaching said storage compartment to said fish tape reel.

2. A fish tape reel according to claim 1, wherein said fish tape reel defines a void therein having an inner peripheral wall of a predetermined shape for carrying said storage compartment.

3. A fish tape reel according to claim 2, wherein said inner peripheral wall has formed thereon a plurality of complementary lap joint members for securely mating said first and second hollow reel segments to each other.

4. A fish tape reel according to claim 3, wherein at least some of said complementary lap joint members are relatively flat for allowing said storage compartment to fit substantially adjacent to and with minimal clearance from said inner peripheral wall.

5. A fish tape reel according to claim 2, wherein said storage compartment includes a curved peripheral wall segment, first and second spaced-apart side peripheral wall segments, and a straight peripheral wall segment; and said inner peripheral wall of said fish tape reel includes a curved wall segment and first and second spaced-apart side wall segments; whereby said curved and side peripheral wall segments of said storage compartment substantially correspond to said curved and side wall segments of the inner peripheral wall of said fish tape reel.

6. A fish tape reel according to claim 5, wherein said storage compartment further includes a tongue formed on respective side wall segments for mating connection with corresponding grooves formed in the inner peripheral wall of the fish tape reel for releasably locking the storage compartment onto the inner peripheral wall of said fish tape reel.

7. A fish tape reel according to claim 6, wherein said storage compartment further includes a locking stud formed at the apex of said curved wall segment for insertion into a corresponding hole in the inner peripheral wall of the fish tape reel for releasably locking the storage compartment onto the inner peripheral wall of said fish tape reel.

8. A fish tape reel according to claim 6, wherein said fish tape reel includes first and second groove inserts for filling the respective grooves when the storage compartment is not being carried by the fish tape reel.

9. A fish tape reel according to claim 1, wherein said fish tape reel includes a trap for receiving the fitting on the end of the fish tape to prevent extension of the fish tape from the fish tape reel when not in use.

10. A fish tape reel according to claim 1, and including a soft, sponge pad positioned within said storage compartment for holding tools, accessories, or fittings in the storage compartment without rattling.

11. A fish tape reel according to claim 10, wherein said pad includes a plurality of voids formed to receive the tools, accessories, or fittings to be contained therein.

12. A fish tape reel, comprising:
   (a) first and second hollow reel segments mated together to define a fish tape enclosure for receiving a length of fish tape with a fitting on one end thereof;
   (b) fish tape access means in at least one of said reel segments for permitting extension and retraction therethrough of a length of fish tape contained in said fish tape enclosure; and
   (c) a storage compartment in at least one of said first and second reel segments for containing tools, accessories, and fittings, said detachable storage compartment comprising a body and a lid attached to said body and detachable there with from the fish tape reel.

13. A fish tape reel according to claim 12, further comprising a lid for cooperating with at least one of said first and second reel segments for enclosing the storage compartment.

* * * * *